United States Patent
Deng et al.

(10) Patent No.: US 11,055,910 B1
(45) Date of Patent: Jul. 6, 2021

(54) METHOD AND SYSTEM FOR GENERATING MODELS FROM MULTIPLE VIEWS

(71) Applicant: A9.com, Inc., Palo Alto, CA (US)

(72) Inventors: Kenan Deng, Palo Alto, CA (US); Xi Zhang, Palo Alto, CA (US); Arnab Dhua, Cupertino, CA (US); Himanshu Arora, Sunnyvale, CA (US); Ting-Hsiang Hwang, San Mateo, CA (US); Tomas Francisco Yago Vicente, San Francisco, CA (US); Sundar Vedula, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 19 days.

(21) Appl. No.: 16/707,862

(22) Filed: Dec. 9, 2019

(51) Int. Cl.
  *G06T 17/20* (2006.01)
  *G06K 9/46* (2006.01)
  *G06T 9/00* (2006.01)
  *G06T 15/04* (2011.01)

(52) U.S. Cl.
  CPC ............... *G06T 17/20* (2013.01); *G06K 9/46* (2013.01); *G06T 9/001* (2013.01); *G06T 15/04* (2013.01); *G06T 2200/08* (2013.01)

(58) Field of Classification Search
  None
  See application file for complete search history.

(56) References Cited

U.S. PATENT DOCUMENTS

2020/0228774 A1* 7/2020 Kar .................. G06T 7/557

OTHER PUBLICATIONS

Valentin Deschaintre, Miika Aittala, Fredo Durand, George Drettakis, Adrien Bousseau, "Flexible SVBRDF Capture with a Multi-Image Deep Network", Jul. 30, 2019, Wiley, Computer Graphics Forum, vol. 38, Issue 4, pp. 1-13.*

Silvano Galliani, "Multi-View 3D Reconstruction With Geometry and Shading", 2018, Thesis, Institute of Geodesy and Photogrammetry Swiss Federal Institute of Technology (ETH).*

Kihwan Kim, Jinwei Gu, Stephen Tyree, Pavlo Molchanov, Matthias Nießner, Jan Kautz, "A Lightweight Approach for On-the-Fly Reflectance Estimation", May 2017, ICCV 17.*

Pratul P. Srinivasan, Richard Tucker, Jonathan T. Barron, Ravi Ramamoorthi, Ren Ng, Noah Snavely, "Pushing the Boundaries of View Extrapolation with Multiplane Images", Jun. 20, 2019, IEEE, 2019 IEEE/CVF Conference on Computer Vision and Pattern Recognition (CVPR).*

Justus Thies, Michael Zollhöfer, Matthias Nießner, "Deferred Neural Rendering: Image Synthesis using Neural Textures", Jul. 2019, ACM, ACM Transactions on Graphics, Article 66.*

(Continued)

*Primary Examiner* — Robert Bader
(74) *Attorney, Agent, or Firm* — Hogan Lovells US LLP

(57) ABSTRACT

A machine learning system receives a reference image and generates a series of projected view images of a physical object represented in the images. Parallel neural networks may receive the reference image and series of projected view images for analysis to determine one or more features of the physical object. By pooling the results from the parallel network, a single output may be provided to a set of decodes that are trained to identify a material property of the one or more items. As a result, a three-dimensional model may be generated that includes a graphical representation of the object as a function of its material properties to enable improved rendering.

18 Claims, 11 Drawing Sheets

(56) References Cited

OTHER PUBLICATIONS

Justus Thies, Michael Zollhöfer, Christian Theobalt, Marc Stamminger, Matthias Nießner, "IGNOR: Image-guided Neural Object Rendering", Nov. 26, 2018, https://arxiv.org/abs/1811.10720v1.*
Zexiang Xu, Sai Bi, Kalyan Sunkavalli, Sunil Hadap, Hao Su, Ravi Ramamoorthi, "Deep View Synthesis from Sparse Photometric Images", Jul. 2019, ACM, ACM Transactions on Graphics, Article 76.*

* cited by examiner

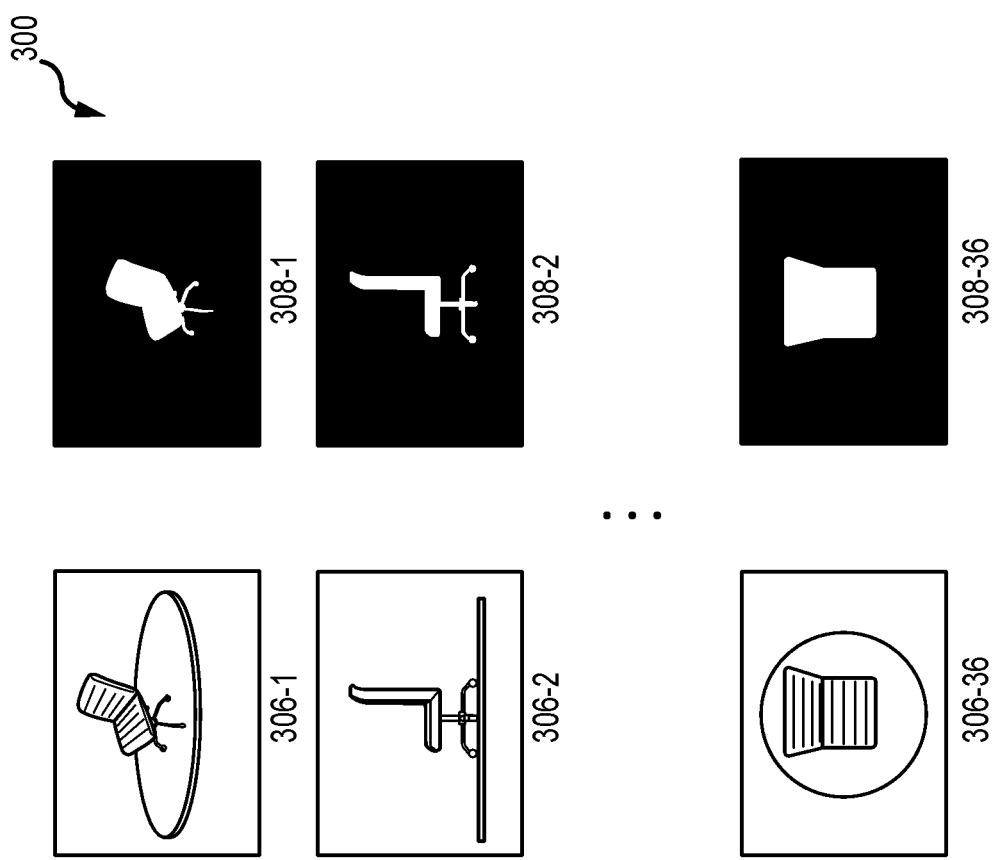
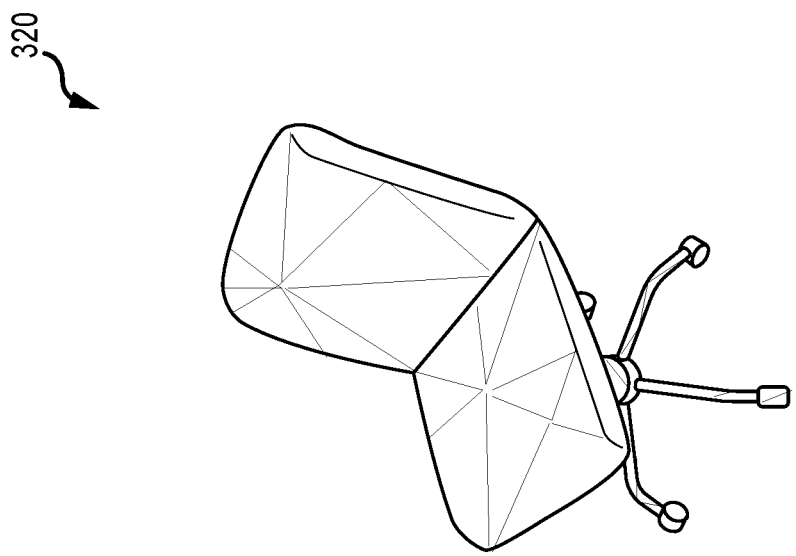
FIG.3B
FIG.3A

US 11,055,910 B1

METHOD AND SYSTEM FOR GENERATING MODELS FROM MULTIPLE VIEWS

BACKGROUND

Users are increasingly using computing devices to perform various actions, such as receiving entertainment and making purchases. For example, a customer may purchase an item over the Internet from an online marketplace. When a customer receives an item, it may be the first time he or she has viewed the item in person. The item may not look the same way the customer envisioned based on photographs viewed online. For example, a customer may order a chair, but when the ordered chair is physically placed beside a table, the customer might not be pleased with its size or style, particularly relative to other items in the room. It may be beneficial to view the chair on the end table in an augmented reality context before ordering it. Augmented reality implementations, however, are only effective if the object in question can be properly rendered in three dimensions. If the scale is inaccurate, if the appearance is distorted or incorrect, or if the object is not rendered accurately from certain angles, then the customer cannot get a true sense of how the object will look in her home.

BRIEF DESCRIPTION OF THE DRAWINGS

Various embodiments in accordance with the present disclosure will be described with reference to the drawings, in which:

FIGS. 3A and 3B illustrate an example image and segmentation mask that can be utilized in accordance with various embodiments.

DETAILED DESCRIPTION

Figure 1:
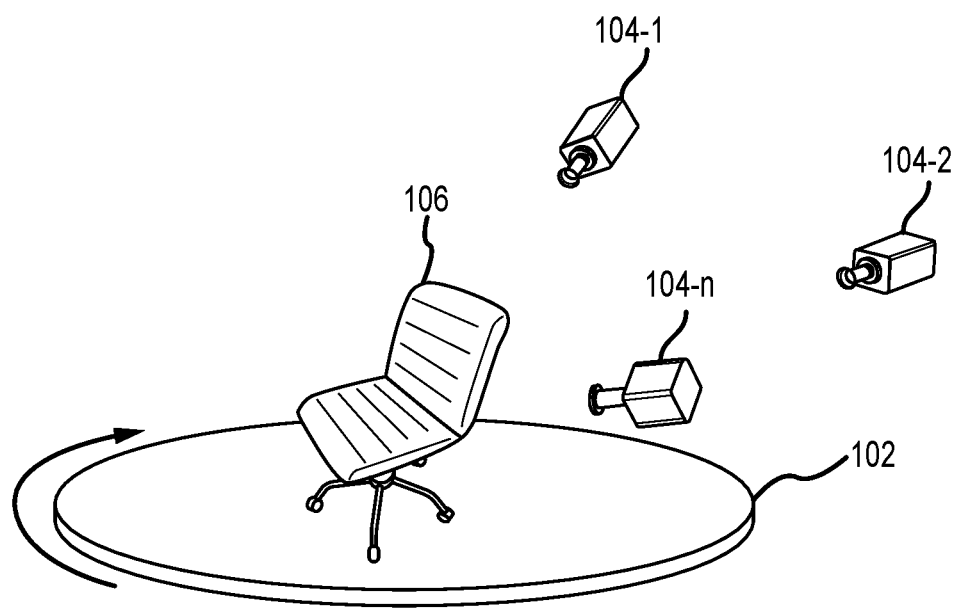
FIG. 1 illustrates an example image capture system that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to generating image information using an electronic device. In particular, various embodiments provide for inverse rendering to enable an input image to be decomposed into a set of images representative of one or more rendering aspects of the image and then reconstructed as a three-dimensional model of an object within the image for augmented reality (AR) or virtual reality (VR) content.

For example, image data may include an object model representing a physical object made out of one or more different materials. These materials may appear differently in a realistic rendering. By way of example only, a metallic surface may reflect more light than a matte surface. Accordingly, accurate three-dimensional representation may be related toward determining various properties of the object model. In embodiments, a spatially-varying bi-directional reflectance distribution function (SVBRDF) may be utilized to decompose an image into albedo (e.g., base color), roughness, and metallicness. Additionally, systems may further incorporate a normal vector representative of a direction of a surface. As a result, images may be geometrically constrained, thereby enabling improved rendering.

A reference view for an image including a representation of an object may be utilized with embodiments of the present disclosure. Traditionally, it would be difficult to render the entire object in an AR or VR environment because the reference view may not include pixel values corresponding to each portion of the object. That is, different regions of the object may be obscured by the object itself. As a result, systems may estimate the pixel values for renderings, which may lead to insufficient or unrealistic renderings, thereby decreasing the user experience. Embodiments may incorporate neighboring view images to analyze different regions of the object to include information regarding regions of the object that may not be visible from the reference view. For example, neighboring view images may include viewpoints that are different from the reference view. These neighboring view images are then projected to the reference view. In other words, the information from the neighboring view images is projected to the viewpoint corresponding to the reference viewpoint. Because the neighboring view images may be from a different viewpoint, there may be pixels within the projected views that fail a visibility test, and as a result, are discarded. By including additional information from the projected views, SVBRDF estimation may be improved by further constraining the problem.

One or more machine learning systems may be used to process a reference object and neighboring view images, which may be translated into one or more projected view images, to decompose the image into different channels, such as channels corresponding to albedo, roughness, metallicness, and a normal. For example, one or more neural networks includes encoders and decoders may be utilized that operate in parallel or substantially in parallel (e.g., at least a portion of the process in a first network overlaps, in time, at least a portion of the process in a second network). Results from a set of encoders may be combined and then transmitted to decoders, which may be particularly selected to identify the above-referenced channels.

Embodiments are directed toward a method for SVBRDF estimation that uses multiple input images to improve the SVBRDF prediction. Moreover, embodiments may predict a normal map in additional to the albedo, roughness and metallicness to improve the generalization of the network. Additionally, embodiments may provide an end-to-end system that not only estimates the SVBRDF, but also generates glTF models that can be rendered.

Various other such functions can be used as well within the scope of the various embodiments as would be apparent to one of ordinary skill in the art in light of the teachings and suggestions contained herein.

Many electronic and computing device offer three-dimensional (3D) imaging using at least one pair of high resolution matched cameras. One such image capture system to obtain images of objects is illustrated in FIG. 1. In the example shown in FIG. 1, an image capture array 100 captures a number of images of an object. The image capture array 100 includes a number of cameras 104-1, 104-2, ... 104-n or other image capture devices, which are positioned about a platen 102 or other such device capable of holding or suspending an object. The platen can include a rotating turntable such as a circular revolving plate or other such platform. Although shown is a platen, the object can be positioned on any surface or otherwise suspended. The image capture devices can include RGB cameras, infrared sensors, and/or other devices. The illustrative cameras 104-1, 104-2, ... 104-n can capture images of the platen 102. An object 106 for which a 3D reconstruction is desired can be positioned on the platen 102. The cameras 104-1, 104-2, ... 104-n capture images of the object 106, the platen rotates, and additional images can be captured from different viewpoints. The number of rotations and the number of cameras 104-1, 104-2, ... 104-n can vary. For example, in various embodiments, 19 cameras and 72 rotations can be used. This results in 1,368 object images, one per camera per platen position.

Figure 2:
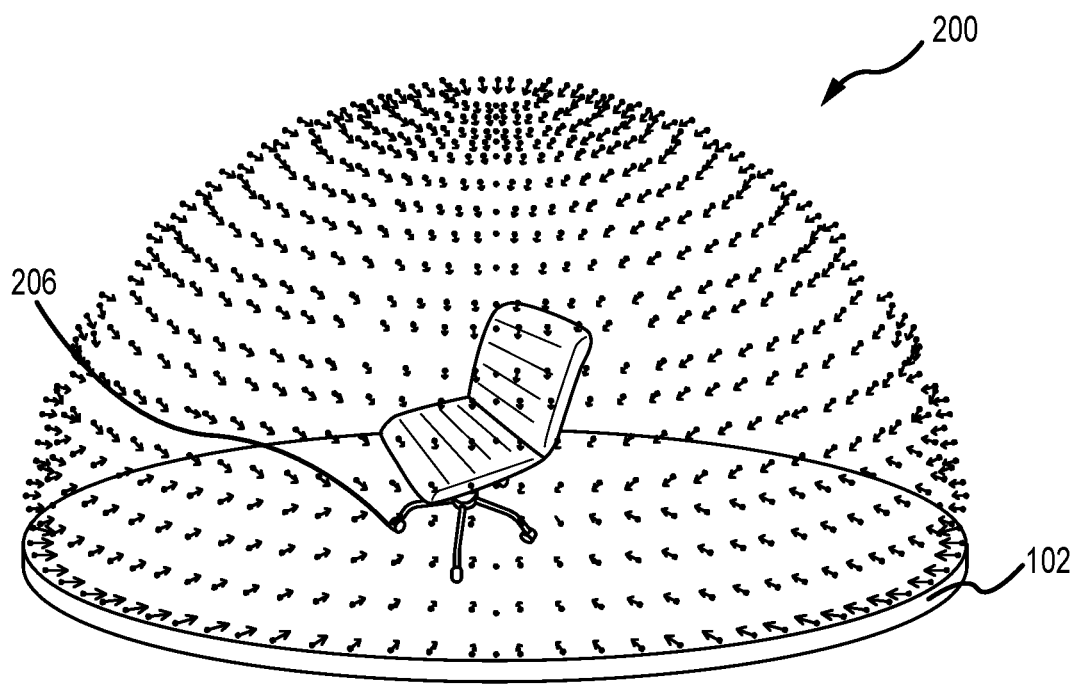
FIG. 2 illustrates an example process of capturing images using the image capture system of FIG. 1 that can be utilized in accordance with various embodiments.

As illustrated in FIG. 2, this can result in capturing object images from a number of different viewpoints in a hemisphere 200 about the object 206. The "density" of this viewpoint hemisphere 200, or total number of viewpoints contained, can depend on the number of image capture devices used and the number of platen positions at which images are captured. For example, in an embodiment the cameras are stationary. That is, only the object to be rendered moves during the image capture process. It should be noted, however, that in certain embodiments the cameras can be moved about the calibration object. In the situation where the platen is rotated, a set of images is captured at an initial platen position, one image for each camera. When the platen 102 rotates to a second platen position, a second set of object images is captured. When capturing image data to reconstruct a 3D representation of the object, each of the cameras captures an image at approximately the same time. As described in FIG. 2, a hemisphere of viewpoints can be captured around an object, portraying the object from a plurality of different angles. For example, 19 cameras can capture images at each of 72 platen positions for a total of 1,368 viewpoints represented. In an embodiment, after object images are captured, segmentation masks can be created based on the object images, and an object mesh structure can be created based on the segmentation masks.

FIGS. 3A and 3B illustrate example images and segmentation masks that can be utilized in accordance with various embodiments. As illustrated in example 300 of FIG. 3A, object images 306-1, 306-2, ... 306-36 are captured portraying the object from various viewpoints. In this example, segmentation masks 308-1, 308-2, ... 308-36 that illustrate the contour of the objects represented in images 306-1, 306-2, ... 306-36 can be determined. Pixels inside the contour can be a first color and pixels outside the contour can be a second color. For example, the first color can be white and the second color can be black; however, other colors and/or variations of the colors can be possible. In an embodiment, conventional visual hull generation techniques including those by Aldo Laurentini, shape-from-silhouette techniques, and so forth can be used to generate a visual hull of the object based at least in part on the object images. For example, based on a viewpoint of a camera, a shape that includes the representation of the object for that camera can be determined. The shape can include, for example a cone like shape. Inside the shape includes the object, outside the shape no object. These shapes can be determined for each camera at each viewpoint to generate a plurality of shapes, where the shapes at least partially intersect. In an embodiment, the object may be included inside the intersection of shapes. Accordingly, the intersection of shapes can create a regional space where the object can be. This regional space can be the visual hull and can be used to generate a three-dimensional reconstruction of the object.

In accordance with various embodiments, the cameras can be aligned mechanically to the extent possible and/or practical. There still can be at least some misalignment, however, such that it can be desirable to improve the process for generating the visual hull to ensure an accurate three-dimensional reconstruction of the object. Conventional approaches for generating the visual hull are sensitive to any error in the position of cameras and thus fail to adequately handle misalignment between cameras, even after calibration of those cameras. Conventional approaches are also sensitive to segmentation errors (e.g., delineation of an object's outline), that is, determining the contour of an object. Accordingly, approaches in accordance with various embodiments provide for generating a visual hull from images captured by cameras positioned with respect to an object, which can be used for the reconstruction of 3D models of objects.

In various embodiments, information about a coordinate system corresponding to an object is obtained. The information can include position information for various positions within a region in space that includes the object. The region can be in the shape of, for example, a cube or other such shape, and can be associated with dimension information describing the dimensions of the cube. A coordinate system can be associated with the object or other reference point. That is, the origin of a three-dimensional coordinate system can be located on the object or reference point. As described, an object can include, for example, various products and/or items including two and three-dimensional items. The objects can be associated with information that describes a size and a shape of an object, as well as position information that describes relationships between different aspects of the object including surface information describing a volume of the object and position information describing positional relationship between the aspects with respect to a coordinate system. In various embodiments, the object may be positioned on a surface, suspended in air, etc. The region can be partitioned into a regular grid or an octree. This can include partitioning the region into a plurality of elements or shapes, e.g., cubes or voxels. In an example, the elements can be partitioned into a 100×100 cubic grid. The information for the coordinate system can include position information for the plurality of elements, such as where those elements are positioned within the coordinate system. In certain embodiments, the elements of the partition can be referred to as a voxel V or pixel. In an embodiment, a scalar field in the region can be defined. For example, for a region R, each voxel can have a value 0 such that the region for all voxels is zero.

A set of camera parameters can be obtained or otherwise determined. The set of camera parameters can be determined, for example, using a camera calibration technique. Example camera calibration techniques include linear camera optimization techniques, non-linear camera optimization techniques, as well any available techniques to those skilled in the art. Such techniques can include techniques to minimize algebraic error, for example. In an embodiment, measuring algebraic error can include using camera parameters to determine three-dimensional locations in a reference coordinate system (e.g., a coordinate system associated with a turntable) of feature points from corresponding features in a two-dimensional camera coordinate system and comparing the determined three-dimensional locations to the actual three-dimensional locations of those features in the reference coordinate system, where the difference between the determined locations and the actual locations can be the algebraic error. The set of camera parameters can be associated with a confidence or uncertainty value. The confidence value can indicate a level of confidence associated with the camera parameters. The set of camera parameters can include, for example, offset values for the points accounting for intrinsic parameters (e.g., focal length, image sensor format, principal point, etc.) of a camera and extrinsic parameters (e.g., coordinate transforms from 3D world coordinates to 3D camera coordinates) of a camera, and in at least some embodiments a model (e.g., a "rectifying model") of the camera(s) capturing that image. In an embodiment, the rectifying model can include transforms or adjustments to be made to an image in order to reduce error in the image. In various embodiments, error can include, for example, misalignment error, reprojection error, algebraic error, etc.

One or more (e.g., a plurality) of images can be captured for different viewpoints of the object, In the situation where the object is positioned on a turntable, the images can be captured for different positions of the turntable, one image for each camera. Segmentation masks can be created based on the images. A segmentation mask be used to determine a contour of an object represented in an image. For example, a segmentation mask can have value 0 at pixels outside an object's contour and value 1 at pixels within the object's contour. The difference in values can be used to determine the contour of the object. In accordance with various embodiments, individual segmentation masks can be associated with a confidence or uncertainty value. In certain embodiments, an integral image of each segmentation mask can be generated. In accordance with various embodiments, an integral image A of an image B can be an image with the same dimensions as image B such that that the value of image A at pixel (x, y) is the sum of the values of image B at the pixels bounded by the axis-aligned rectangle with opposite corners at (0,0) and (x, y).

For each segmentation mask, the camera parameters can be used to project a voxel or pixel from the region in the reference coordinate system onto a point in a segmentation mask in a camera coordinate system. A decision can be made about the probability of a voxel being within a surface of the object based on the projection. For example, the decision can be based on a confidence or uncertainty value associated with the camera parameters used to project a voxel and/or a confidence or uncertainty value associated with the segmentation mask the voxel is projected onto. In an embodiment, the probability can be based on the confidence or uncertainty value associated with the camera parameters used and/or the confidence or uncertainty value associated with the segmentation masks.

For example a shape of a window the projected voxel is associated with can be defined. It should be noted that the shape can be any shape as may include a rectangle, a square, a free form shape, etc. The shape can be based on the confidence or uncertainty associated with the camera parameters used and/or the confidence or uncertainty associated with the segmentation masks. In an embodiment, the larger the window, the more uncertain the calibration is. An example of a large window can be a window including more than 1000 pixels. An example of a small window can be a window including 20 pixels. Determining the probability values can include determining a number of pixels inside and outside the contour within the window. For example, the window for a projected voxel may reside within the contour, outside the contour, or partially inside and partially outside the contour. For the window, a number of pixels outside the contour and a number of pixels inside the contour can be determined. A ratio of the number of pixels inside the contour and a total number of pixels can be determined. The ratio can be the probability value associated with the projected voxel. The ratio or value can represent a probability that the voxel is inside the surface of the object. The process is repeated for each voxel in the region, where each voxel is associated with a probability value between 0 and 1.

As described, the values represent the probability of a voxel being inside the surface of the object. A marching-cubes technique or other such technique can be used to generate a visual hull of the object based on the probabilities. For example, the marching-cubes technique can use a threshold to separate "inside" from "outside" regions of the surface of the object. The threshold may be chosen in accordance with a desired probability for the partial inclusion or exclusion of a voxel. For example, a value for this threshold can be the logarithm of 0.5, corresponding to a 50% probability. In an example, the probability value associated with each voxel is compared to a threshold probability value. Voxels associated with a probability value that satisfies the threshold are kept. Voxels associated with a probability value that does not satisfy the threshold, for example, is less than the threshold, can be discarded. Thereafter, for the voxels associated with a probability value that satisfies the threshold, at least one surface interpolation technique can be used generate an object mesh structure or other surface of the object. In embodiments, the object mesh structure can be used to generate a three-dimensional representation of the object, such as three-dimensional representation of the chair 320 illustrated in FIG. 3B. In this example, from a display of a client device, the object mesh structure can be manipulated to be viewed from different orientations. The appropriate object image can be overlaid on the object mesh structure so that when a given viewpoint of the object mesh structure is requested, the object image for that viewpoint is presented to a user. Techniques for generating the visual hull will not be further described herein, but may include techniques described in U.S. patent application Ser. No. 15/840,876, titled "Determining a Visual Hull of an Object," which is hereby incorporated by reference.

In various embodiments of the present disclosure, a visual hull algorithm may be utilized to generate a geometry of an object, which may be representative of a physical object.

However, as noted above, it may be desirable to render this object accurately in view of lighting or other features present within an environment for use in a virtual or augmented reality application. Accordingly, embodiments of the present disclosure are directed toward inverse rendering the object by decomposing the object into a set of images representative of different material properties. Thereafter, the decomposed images can be re-composed into the same image. In embodiments, the image is decomposed into images representative of material properties related to albedo (e.g., base color), roughness, and metallicness. These particular features may correspond to channels or components that at least partially define a three-dimensional (3D) model, which may be rendered using one or more applications. By extracting these particular features from an image, different aspects of the model may be determined for 3D modeling. However, as noted above, there may be several hundred pictures to evaluate, which may be processing intensive. Accordingly, embodiments of the present disclosure may utilize fewer images to predict portions of an object model representative of a physical object.

Systems and methods of the present disclosure may automatically generate 3D models of objects composed of a various materials. These materials may appear differently in a virtual or augmented context. For example, a metallic object may be more reflective than a matte object. Generating realistic looking models from images rendered using physically based rendering, as described above, enables improved user experiences for AR and VR applications. The 3D models generated using the present systems and methods may be useable across a greater variety of applications, for example, compared to 4D models that may be restricted to particular rendering programs. As noted above, the models may be utilized in AR applications related to online marketplaces that enable a user to visual an object within a physical space to determine how the object will appear in the space prior to purchasing the object, however, it should be appreciated that such an application is provided for illustrative purposes only and that other applications may also utilize embodiments of the present disclosure.

Embodiments of the present disclosure utilize the physically generated 3D models and infer various material properties using one or more images of the object. In other words, SVBRDF estimation may be utilized to generate the models. As will be appreciated, estimation of SVBRDF is an ill-posed problem, which may be defined as a problem that does meet the three Hadamard criteria for being well posed, those criteria being: 1) a solution exits; 2) the solution is unique; and 3) the solution's behavior changes continuously with the initial conditions. For example, inverse problems may often be referred to as being ill-posed.

Figure 4:
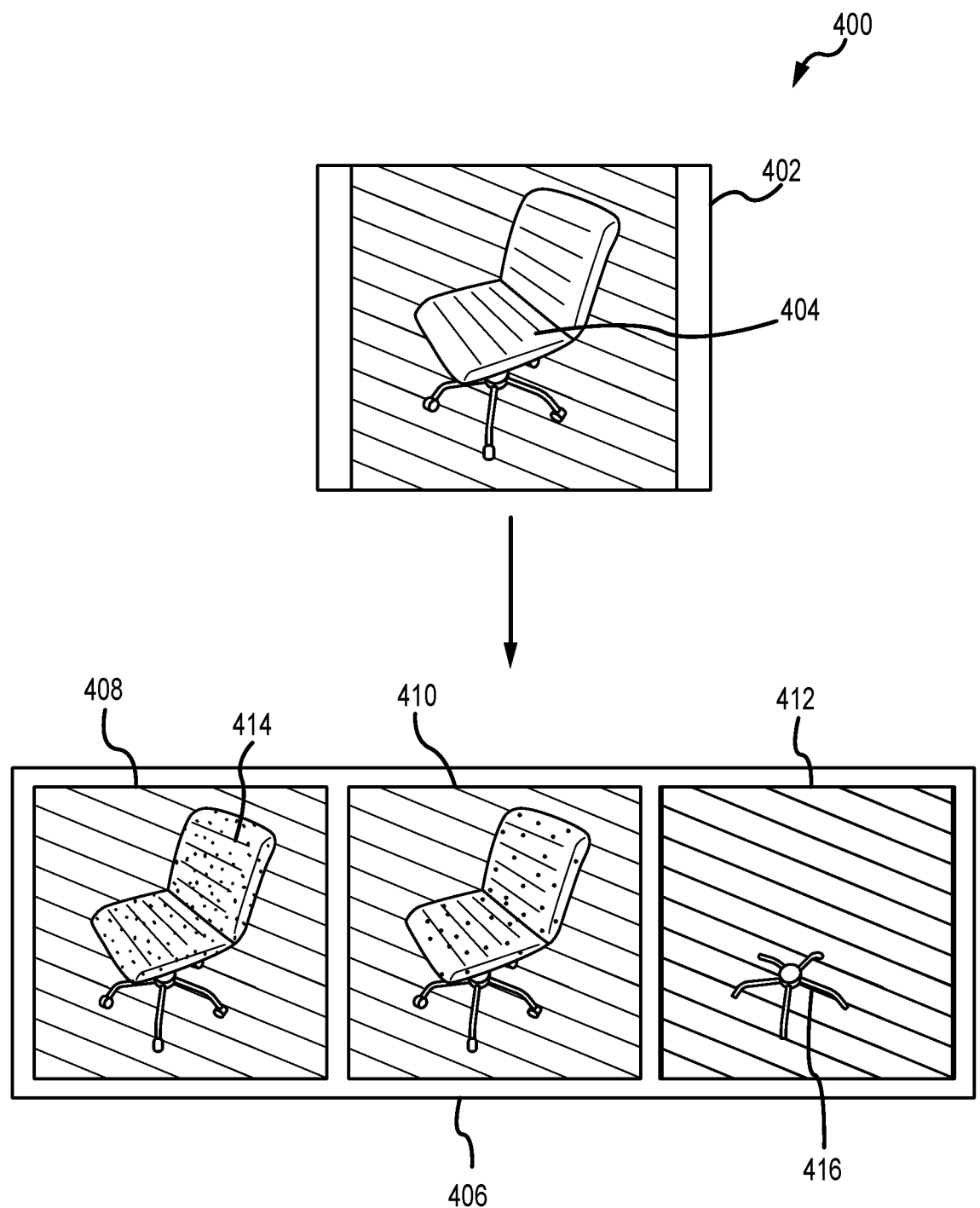
FIG. 4 illustrates an example image decomposition process that can be utilized in accordance with various embodiments.

FIG. 4 illustrates an example environment 400 for decomposing an image of an object into several images, for example by using SVBRDF estimation. In this example, an image 402 may include a representation of an object 404, which is illustrated as a chair in FIG. 4. The image 402 may be a physical generated 3D model, such as those models described above. As noted, it may be desirable to break the image down into material properties to enable improved rendering for AR and VR applications, among other applications. It should be appreciated that the component parts (e.g., material properties) may be present in each part of the image, although, may have a low value. For example, a matte cloth portion may still have a metallicness value, although, that value may be small when compared to a polished chrome component. The image 402 may be decomposed into an output set 406 including a first output image 408, a second output image 410, and a third output image 412. As will be described below, one or more machine learning systems, which may include a trained neural network that includes a plurality of encoders and decorders, may be utilized to decompose the image 402.

In the illustrated embodiment, the first output image 408 corresponds to an albedo representation, the second output image 410 corresponds to a roughness representation, and the third output image 412 corresponds to a metallic representation, which has been simplified to show features that have a certain level of metallicness, although, it should be appreciated that each portion of the object 404 will have some level of metallicness. Each of the images 408, 410, 412 appears different due to the different material properties represented, and as a result, are rendered differently due to their different properties. For example, if the object 404 includes a cloth upper area 414, the cloth would have a low value in the third output image 412, which includes metallic legs 416 of the chair. In other words, when a classifier in a neural network evaluates the cloth material, properties corresponding to metallic surfaces will likely not be identified as having significant values, and as a result, the metallic components of the object 404 are particularly identified. However, as noted, the absence of the upper portion in the third output image 412 is not intended to indicate that the upper portion is wholly discarded, but is provided as a reference to illustrate that certain regions may have a great metallicness than other regions. Similarly, the roughness of the cloth upper area 414 is further represented in the second output image 410, due to the texture of the cloth upper area 414. These material properties may be useful for providing AR or VR representations. By way of example only, the metallic legs 416 may reflect light differently. Additionally, a very rough cloth upper area 414 may have different shading when exposed to different light.

Embodiments of the present disclosure are directed toward generating models into formats that enable operation in a variety of different rendering engines. A non-limiting list of examples includes Collada, obj, etc. In embodiments, GL Transmission Format (glTF™), developed by The Khronos Group, Inc. may be a desirable format for 3D model data representation. Advantageously, glTF is capable of storing data in both a binary format (*.gib) or mixture format (*gltf with multiple textures). Data representation in binary format is quicker to parse and can be directly loaded and bound to OpenGL buffers. Moreover, glTF natively supports physical based rendering requirements and is supported as an export format for various 3D software applications, such as Maya, 3D Max, and the like. As will be understood by one skilled in the art, a glTF model includes both a 3D mesh (e.g., a non-textured geometry model) and various channels to represent different qualities like base color, metallicness, etc. These channels may be represented as UV mapped textures and, in various embodiments, may favorably correspond to the estimates generated by the illustrated embodiment, further demonstrating why glTF formatting may be advantageous. However, glTF utilizes UV maps, whereas embodiments of the present disclosure are providing estimates on a "per view" basis for various objects.

Single-view networks may be used in order to evaluate an input image and output various channels for different material properties. For example, a single view network, may utilize an image recognition network, such as ResNet18, which may be a trained network using images from the ImageNet database. However, it should be appreciated that the network may be trained with additional or different images to classify and/or extract different criteria. The single view network receives a 3-channel RGB image and outputs 3 different properties: a 3-channel RGB albedo, a 1-channel roughness, and a 1-channel metallicness. In various embodiments, the network may include a variety of different levels, such as convolution layers, rectifiers, maxpool layers, and the like. However, such single image networks may be insufficient when evaluating a single image from a single viewpoint. That is, a single viewpoint may not be representative of how an object will appear under different lighting conditions or when shifted to apply a different viewpoint. Moreover, the view from the single viewpoint may also obstruct portions of the object, which would be visible from a different viewpoint, thereby presenting problems for rendering in an AR or VR environment where a user may adjust a viewpoint. Embodiments of the present disclosure may utilize a multi-view approach that incorporates one or more visibility tests in order to estimate an appearance of various pixels of the rendered object.

Figure 5:
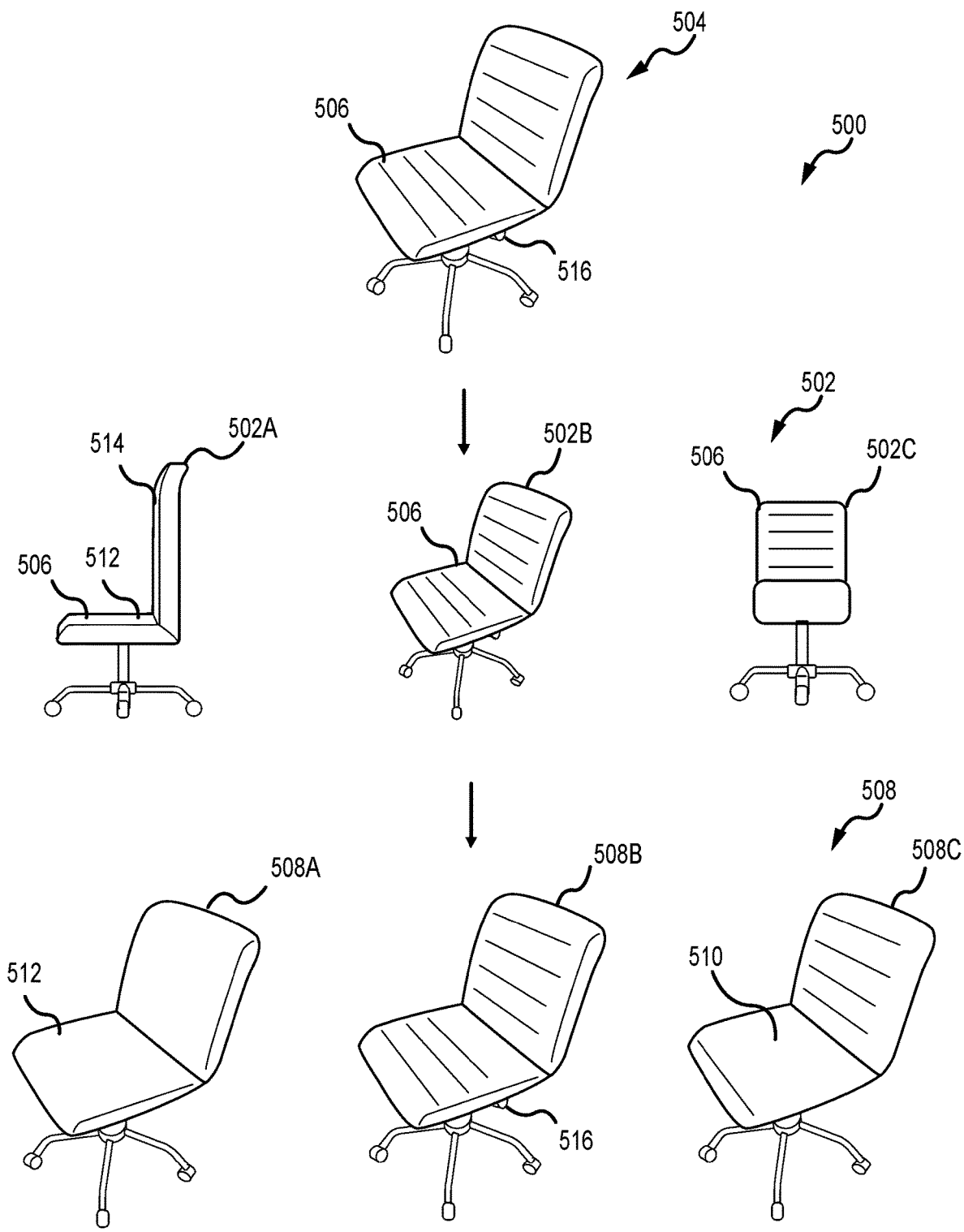
FIG. 5 illustrates an example image projection process that can be utilized in accordance with various embodiments.

FIG. 5 illustrates an example of a neighboring view configuration 500 that may be utilized with embodiments of the present disclosure. It should be appreciated that while three neighboring view images are utilized in the illustrated embodiment, this number is provided for illustrative purposes only and there may be more or fewer images utilized in other embodiments. The neighboring view configuration 500 may be part of the above-described multi-view approach that, rather than looking at a single image, incorporates views from a variety of different perspectives in order to obtain information related to an appearance of an object for improved rendering. As noted above, SVBRDF estimation using a single image is an ill-posed problem. Traditional methods, such as the single-view network using ResNet18, may try to utilize prior information, such as training data, to constrain the problem and generate a model for 3D rendering. However, from a single image, information is lacking regarding apparent pixel colors of an image due to the albedo color or reflections of light. In other words, each pixel may not be viewable from a variety of angles, and as a result, attempts to determine pixel values at those areas may be challenging. This leads to less realistic renders, as the appearance of a point on an object can change due to the way light is reflected off the surface. SVBRDF may govern this reflection and pixel color estimation. Embodiments of the present disclosure include additional views, which add equations and constraints to the problem, thereby limiting a search space of the true parameters.

Merely including multiple image views is insufficient to overcome the problems presented by single-view networks because of potential transformation and orientation misalignments. That is, the network may not have 3D knowledge of the scene, but rather, a series of seemingly related images. Accordingly, mapping of pixels may be useful in determine how different points of an object are connected in different views. Embodiments of the present disclosure, however, may incorporate pose information of the camera array and available depth data to solve data association problems between different views.

In various embodiments, a plurality of neighboring view images 502 may be projected onto a reference viewpoint corresponding to a reference image 504. That is, the neighboring view images 502, each being at a respective neighboring view viewpoint, are projected as if being viewed from the reference viewpoint. In various embodiments, the reference image 504 may correspond to a photograph and/or a model that includes geometry information for an object 506 represented in the reference image 504. The neighboring view images 502 are then projected to the reference viewpoint to form a plurality of projected view images 508. As a result, the plurality of projected view images 508 may be used, for example with an encoder described herein, to determine material properties of the object 506. In certain embodiments, the plurality of projected view images 508, based on the neighboring view images 502, may include a sufficient number of views to identify each portion illustrated in the reference image 504. The image 504 may be an object model that is being utilized and decomposed for SVBRDF prediction. The illustrated embodiment of FIG. 5 includes three neighboring view images 502A-C, however, it should be appreciated that more or fewer images may be utilized. Each of the neighboring view images 502A-C is representative of the image 504 when viewed from a different perspective, which may be referred to as respective neighboring view image viewpoints. As will be described below, in various embodiments, different pixels or points of the object 506 may not be visible from each perspective. Evaluating the visible and non-visible areas may enable the system to filter out areas of the image that are visible and non-visible.

The plurality of projected view images 508, formed by translating the object 506 from the neighboring view image viewpoints to the reference viewpoint may be defined by Equation 1, where x is the image coordinate of a point in one image and x' is the corresponding coordinate in another image. K is the intrinsic parameter of the camera and R,t represents the rotation and translation separately, with z being depth.

$$x' = KRK^{-1}x + \frac{Kt}{z} \quad (1)$$

In various embodiments of the present disclosure, the image 504 may be a 3-channel RGB image at a reference view point and several (in this case 4) 3-channel RGB images at neighboring viewpoints are projected onto the reference view point. That is, the neighboring view images 502A-C are adjusted to illustrate how they would be viewable from the reference viewpoint associated with the image 504. As a result, various regions of the neighboring view images 502A-C are non-visible from the reference viewpoint.

As illustrated, the neighboring view images 502A-C include noise and missing regions 510 due to visibility testing and interpolations. In various embodiments, the neighboring view images 502A-C have different noise characteristics than the image 504. Accordingly, as will be described below, a separate encoder may be used to evaluate the neighboring view images 502A-C.

By way of example only, the neighboring view image 502A illustrates a side view of the object 506, and as a result, various rejections are not visible, such as details of a seat 512 or back 514, as well as a well 516 illustrated in the reference image 504. As illustrated, the neighboring view image 502A is at an angle where details of the seat 512 are not visible, and as a result, the projected view image 508A lacks details in the seat 512. Moreover, the leg 516 is not visible from the neighboring view image 502A, and as a result, the projected view image 508A does not include the leg 516, this may be contrast to the projected view image 508B, which does include the leg 516. This information may be useful, for example, when rendering the object in a scene where a light source is low, which may not affect how the pixel values for the seat 512 appear.

In various embodiments, the neighboring view images 502A-C may be selected, at least in part, to attempt to reconstruct the pixel values for the image 504. That is, the number of views selected may be based, at least in part, on determining a value for each pixel value. For example, using only the neighboring view image 502A may not provide sufficient information for the back 514. By adding in the neighboring view image 502C, information for the back 514 may be obtained. However, that combination may be insufficient for other parts of the object 506, and as a result, additional views may be selected. As noted above, the pixel values may be evaluated and determined based Equation (1) to determine whether a value is associated with a particular pixel. Values above a certain threshold may satisfy a visibility test. Other values, however, may not satisfy the visibility test and may be discarded (e.g., not included when determining values for the particular pixel).

As will be appreciated, utilizing the neighboring view images 502A-C provide more information for evaluation and eventual rendering than only using the reference image 504 by itself. For example, there are varieties of regions that are not visible from the reference viewpoint associated with the reference image 504. However, transforming pixel values from different viewpoints may be useful for filling in the gaps of the reference image 504. In other words, the set of images associated with the neighboring view images 502A-C includes more cumulative information than the reference image 504, even when individual images of the neighboring view images 502A-C include gaps or holes.

In various embodiments, determining an orientation of a surface of the object may be useful for rendering the object in an AR or VR environment. Generation of a normal vector for a variety of pixel locations may improve both learning and rendering. For example, with learning, adding normal vectors as output and adding supervision enforces generation of a meaningful representation that both makes sense for local textures as well as for geometry. That is, the network is geometry-aware to disambiguate in the ill-posed scenario presented by SVBRDF estimation.

Utilizing embodiments of the present disclosure enables additional images for use in determining material properties of objects, which may enable for realistic presentation in AR and VR environments. For example, in a traditional system, a single image associated with the reference image may be processed. As a result, as noted, regions of the object that are not visible in the image may be estimated or interpolated, leading to a less realistic rendering.

Embodiments utilize the neighboring view images to generate projected view images and provide additional information for use with rendering. For example, for each neighboring view image, an individual projected view image may be generated. As a result, in the embodiment of FIG. 5, a total of four images are processed using the encoders and decoders, rather than just one with the reference image alone. Advantageously, the cumulative information of the projected view images, along with the reference image, enables more accurate determinations of material properties, which may be stitched onto mesh models of the object for more realistic rendering in AR and/or VR environments.

Embodiments of the present disclosure may define the normal vector in camera space. By way of example only, the normal vector may have a unit norm and x, y, z components of the vector may be in −1 to 1 range. The normal vector may be defined in a tangent plane coordinate system of the geometry. However, because it is often the case that the normal map points outwards from the object and coincides with per vertex normal from the geometry itself, there may be a uniform value across the ground truth normal image. Accordingly, the ground truth normal may be transformed from the tangent space to the camera space by multiplying a TBN matrix and a model view matrix, as shown in Equation 2.

$$\overrightarrow{n_{camera}} = MV \times TBN \times \overrightarrow{n_{tangent}} \quad (2)$$

In Equation 2, the TBN matrix is defined as a matrix whose columns consist of a tangent vector, a bi-tangent vector, and the cross product of the two. MV is the model view matrix that transforms from the model space to the camera space.

Figure 6:
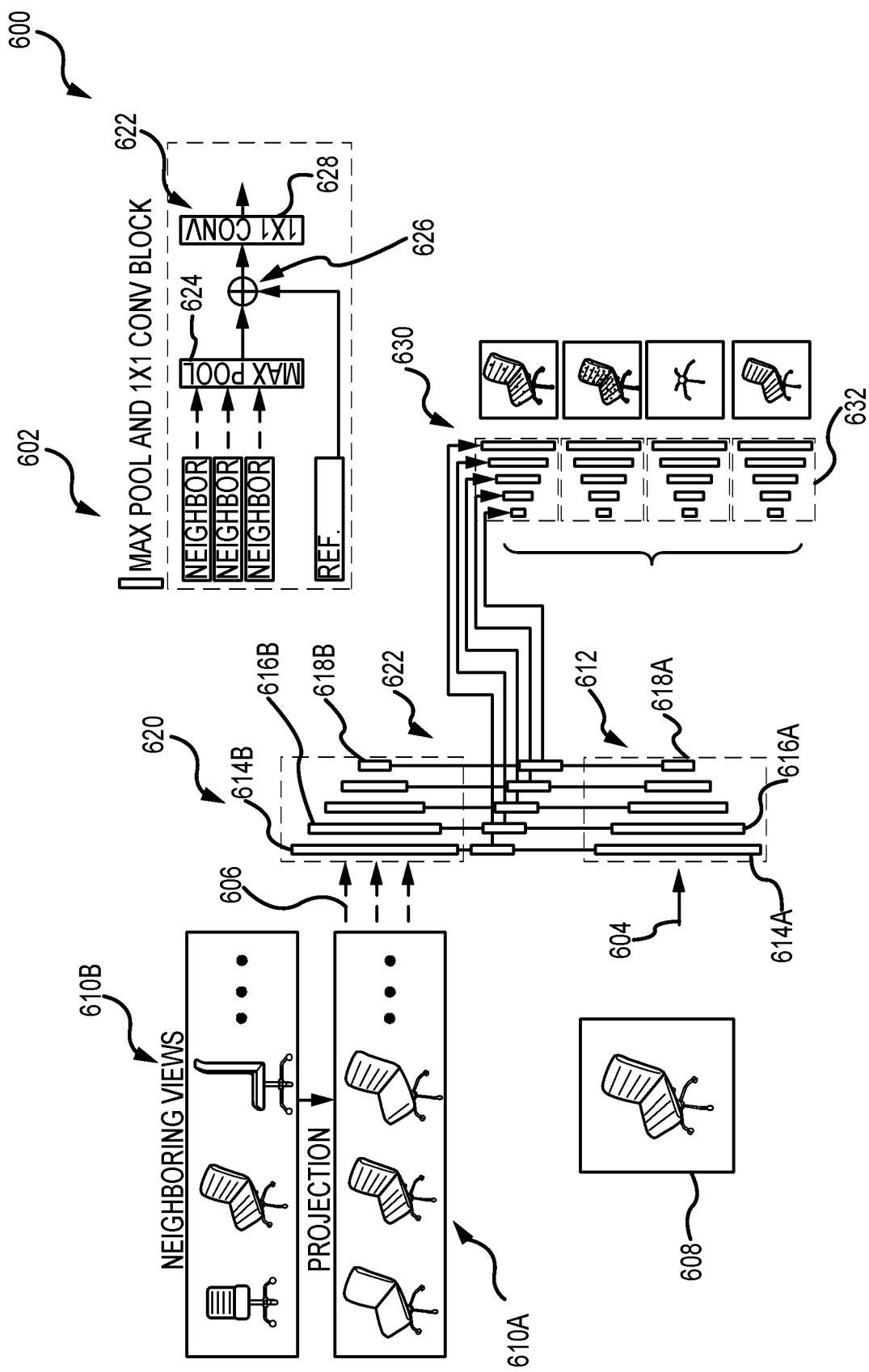
FIG. 6 illustrates an example environment including a machine learning system that can be utilized in accordance with various embodiments.

FIG. 6 illustrates an example multi-view network 600 that may be part of a machine learning system used with embodiments of the present disclosure. The illustrated multi-view network 600 includes a neural network 602 having two different input paths. In various embodiments, a first input path 604 and a second input path 606 may operate in parallel or substantially in parallel (e.g., at least a portion of processing during the first input path 604 overlaps at least a portion of processing during the second input path 606). For example, the paths 604, 606 may begin at approximately the same time, may end at approximately the same time, or may have at least some overlapping processing times.

The first input path 604 receives a reference image 608. The reference image 608 may be similar to the image 504 describe above. That is, the reference image 608 may correspond to the image utilized to generate the neighboring views and may be from a physical model, as noted above. In contrast, the second input path 606 receives projections 610A of neighboring images 610B, which may correspond to the neighboring view images 502. As a result, the system may utilize the combined information provided by both the reference image 608 and the projections 610A, thereby providing additional data for processing, which may lead to improved models for rendering. It should be appreciated that while only three projected view images 610A are illustrated, that any number of projected view images may be utilized with embodiments of the present disclosure.

In various embodiments, the neural network 602 may have an hourglass shape. The illustrated embodiment includes a first network region 612 (e.g., encoder) that includes convolutional layers 614A. It should be appreciated that any reasonable number of layers may be incorporated into the convolution layers 614A, and moreover, any reasonable stride and additional processing operations may also be included, such as batch normalization or ReLU. The illustrated first network region 612 also includes a maxpool layer 616A, and three residual blocks 618A. The first network region 612 may receive and process the reference image 608, for example to identify various features, for later combination with the neighbor images 610.

The neural network of the illustrated embodiment also includes a second network region 620, which substantially corresponds to the first network region 612 and receives the projected view images 610A via the second input path 606. As noted above, the second network region 620 (e.g., encoder) may receive the projected view images 610A generated by the the neighbor images 610B and identify one or more features within the images, which may be utilized to identify the material properties described above.

Embodiments utilize encoders and decoders that may correspond to a single-view network, but for each feature level, a max-pooling and 1×1 convolution block is used to combine the reference view and the neighbor view features. In the illustrated embodiment, each of the layers of the first and second network regions 620 utilizes skip connection with an instance-wise max pooling layer 622. That is, each layer may direct an output toward a respective layer of the instance-wise max pooling layer 622. As a result, identified features from the projected view images 610A may be combined with respective features from the reference image 608. Further illustrated in FIG. 6 is the instance-wise max pooling layer 622 that includes a neighbor feature max pooling layer 624, a concatenation operation 626, and a max pool layer convolution 628. By max pooling the features from the projections 610A, the identified feature will be the same regardless of the order of the neighbor images. Moreover, regions that fail the visibility test are filtered out.

Output from the instance-wise max pooling layer 622 may be directed toward a third network region 630 (e.g., decoders). It should be appreciated that the third network region 630 may include a plurality of decoders, which each decoder being trained to identify one or more different material properties, among other potential outpouts. As illustrated, individual skip connection may direct output from particular layers into the input of other particular layers, rather than directing output toward each subsequent layer. In various embodiments, the encoder and/or decoders may be particularly designed to correspond to a certain material property. For example, there may be encoders and/or decoders that correspond to the albedo, roughness, metallicness, and normal, as noted above. In the illustrated embodiment, third network region 630 may include upsampling blocks 632, which may also include convolutional layers, batch normalization, ReLu, and the like.

By way of example only, the neural network may include a 7×7 convolutional structure with a stride of 2. Furthermore, the convolutional layers may include batch normalization and ReLU. Various embodiments also include a maxpool layer, such as a 3×3 maxpool with a residual block. Additional residual blocks may also be incorporated into the system. It should be appreciated that a variety of layers may be incorporated into the system and that, in various embodiments, the number of layers may correspond to a number of upsampling blocks, thereby generating the hourglass shape. In certain embodiments, outputs from the various layers may be collected at a second maxpool layer and then directed toward another convolutional layer, such as a 1×1 convolutional block. Thereafter, the output may be directed toward the upsampling blocks, which may include 3×3 convolutional layers with batch normalization, ReLu, and further upsampling. Each of the decoders may correspond to a particular material property, thereby enabling generation of an image file having particular properties related to the specific material property.

Figure 7:
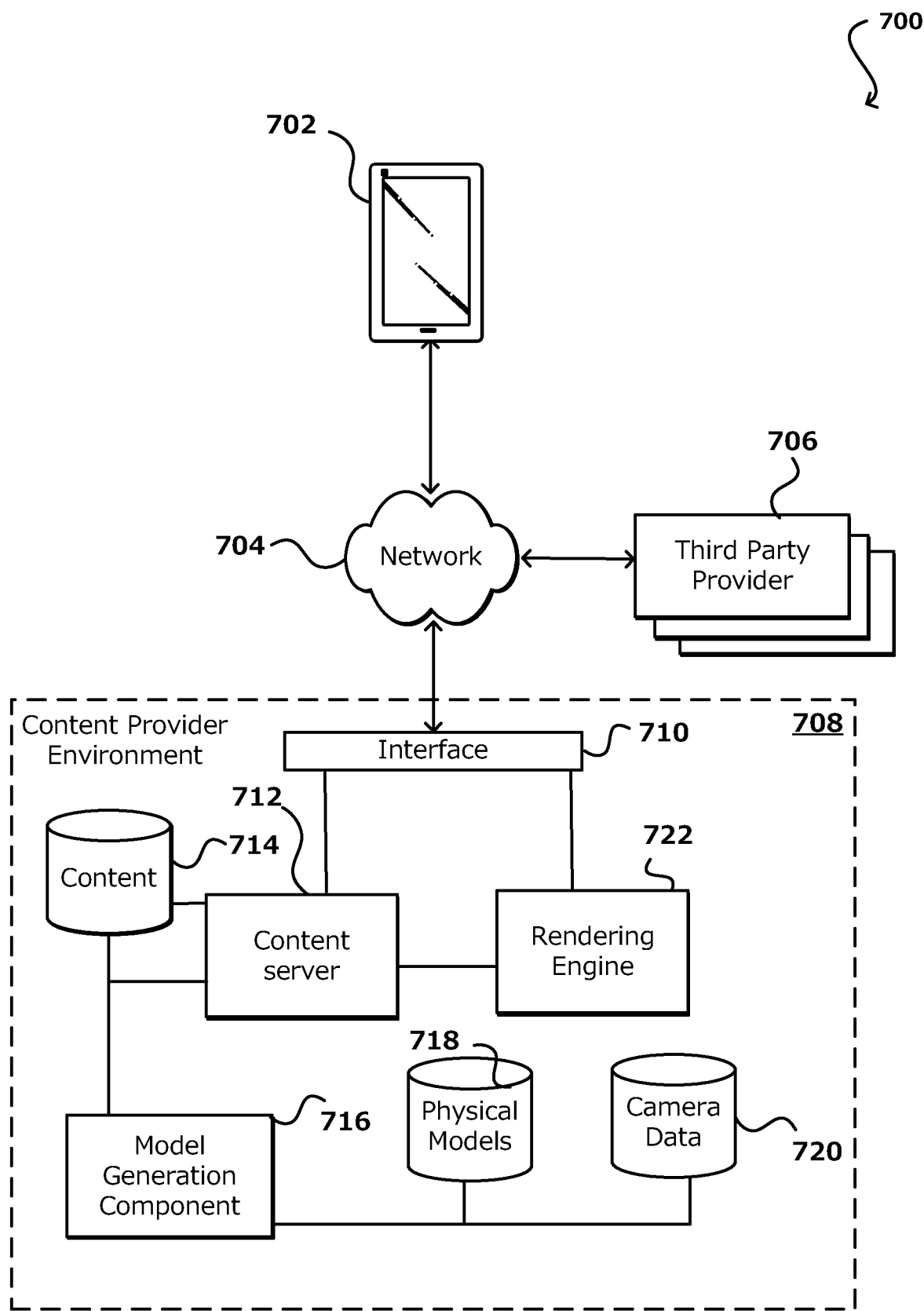
FIG. 7 illustrates an example computing environment that can be used to implement aspects of various embodiments.

FIG. 7 illustrates an example environment 700 that can be used to implement aspects in accordance with various embodiments. In FIG. 7, a client computing device 702 can submit a request for content across at least one network 704 to be received by a content provider environment 708. In some cases, a request received to the content provider environment 708 might be from another entity, such as a third party provider 706. In this example, a call received to the resource provider environment 708 can be received by an interface layer 710 of the environment. As known for network environments, the interface layer can include components such as interfaces (e.g., APIs), load balancers, request and/or data routers, and the like.

The content request may be associated with a request for AR or VR content, as described above, and may be directed to one or more content servers 712, which can obtain content from a content data store 714 or other such repository to be sent back across the network(s) to the computing device 702. In some embodiments, the content data store 714 includes automatically generated models utilizing one or more aspects of the present disclosure. These models may enable 3D content generation onto the computing device 702.

In various embodiments, content populating the content data store 714 may be provided by a model generation component 716. The model generation component 716 may include one or more machine learning systems, such as those described herein, that use SVBRDF estimation to generate models that may be utilized in 3D rendering applications. As described, the machine learning systems may include hourglass networks that include parallel (or near parallel) processing paths that evaluate a reference image along with projected view images generated using one or more neighboring views. Encoders from each of the parallel paths may output their results to be pooled and then directed toward decodes that are classified to provide information relate to one or more material properties of an object, such as albedo, roughness, and metallicness. Moreover, in embodiments, a normal may also be determined to further provide sufficient information for generating a 3D model.

Generation of the models using the model generation component 716 may utilize one or more models generated using a physical component modeler, as described above. These models may be stored in a physical models data store 718. In embodiments, camera data may also be provided from a camera data store 720, which may facilitate calculation of the normal and/or determination of the neighboring views. In response to the request from the user device 702, a rendering engine 722 may retrieve the appropriate content for distribution to the user device 702. It should be appreciated that the rendering engine 722 is illustrated in the environment for illustrative purposes only, and that in various embodiments, the rendering engine 722 may be local on the device 702.

Figure 8:
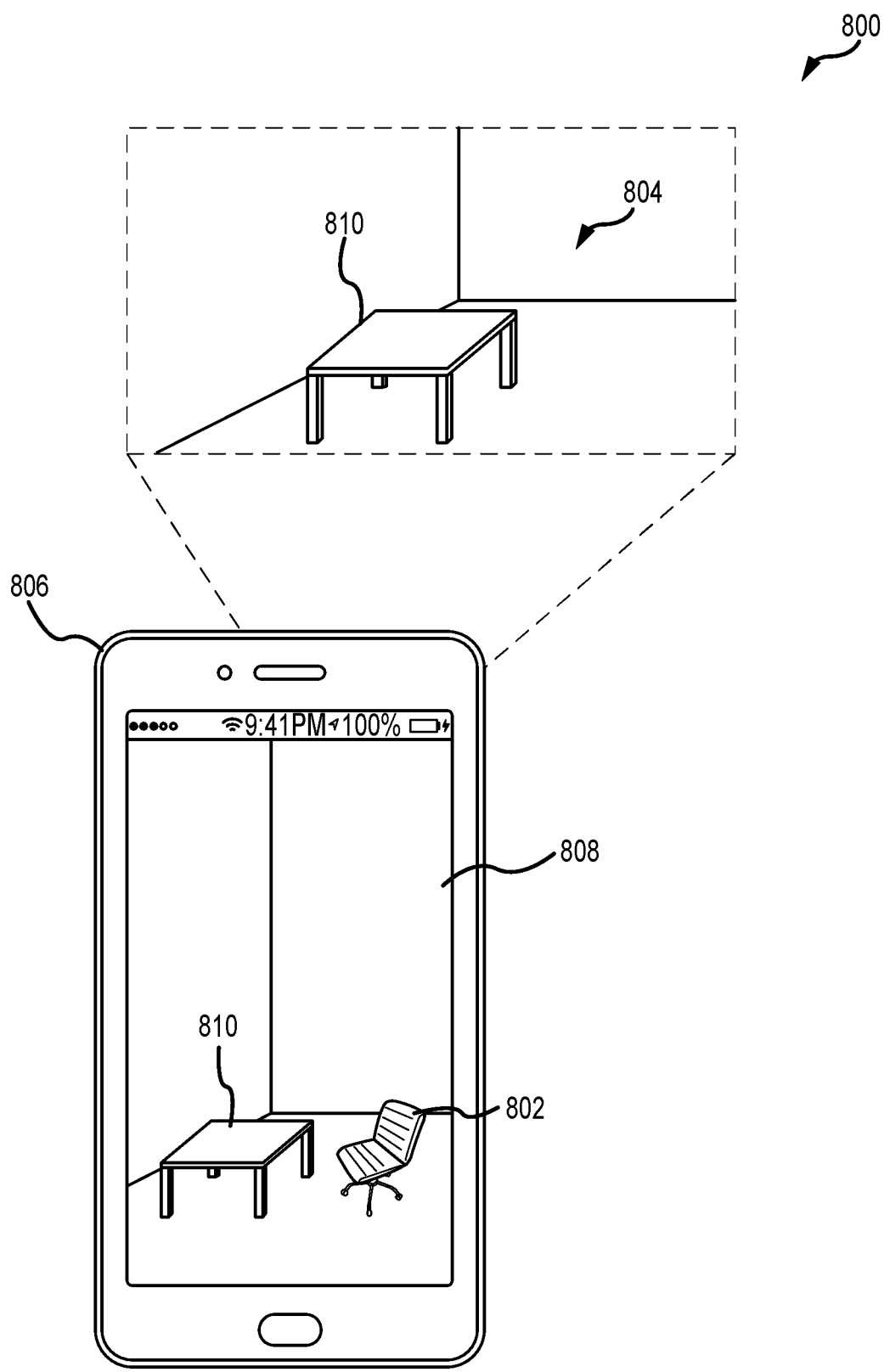
FIG. 8 illustrates an example computing device including a rendered image that can be utilized in accordance with various embodiments.

FIG. 8 illustrates an example of a user interacting with an item through an augmented reality setting. As will be appreciated, renderings generated using embodiments of the present disclosure may be utilized in AR applications, such as the example environment 800 of FIG. 8, where a user may receive a visual representation of an object 802 arranged within a scene 804. The illustrated object 802 correspond to a chair and is viewed as if it were in the user's home on a mobile device 806. Through the device display 808, the object 802 is positioned proximate a table 810, allowing the user to visualize how the object 802 will look in the surrounds of the scene 804. The user can compare the object 802 to the color of the table 810 and/or to the height of the table 810, among other potential comparisons.

The user can also rotate the representation of the chair 802 or move it around on the end table 810. This way, the user can understand how various items would look in her apartment before purchasing them. The chair 802 can be represented in three dimensions by the object mesh structure described above. The object mesh structure is overlaid by the appropriate views mapped from the texture atlas. Therefore, the user views a three-dimensional structure where each portion of the structure is overlaid by a projection of an actual image of the structure. As will be appreciated, embodiments of the present disclosure may enable more realistic rendering of the object 802. For example, a light source in the scene 804, such as from a window, may reflect off the legs of the chair 802. If the user finds the reflection distracting or undesirable, the user may select a new object, thereby increasing the user's satisfaction when the object arrives and/or decreasing the likelihood the user will be unhappy when the object arrives.

Figure 9:
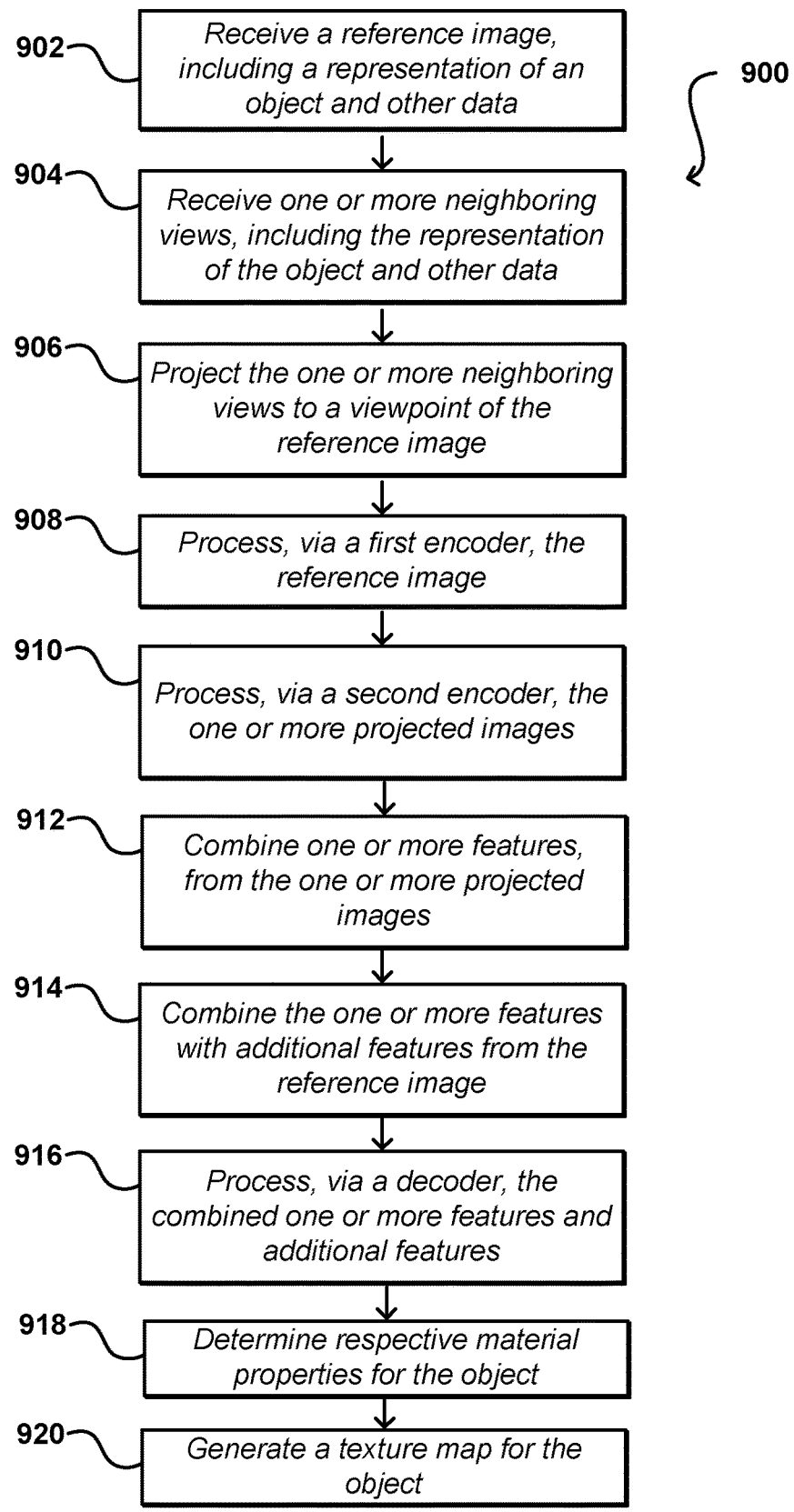
FIG. 9 illustrates an example process for creating a three-dimensional object model that can be utilized in accordance with various embodiments.

FIG. 9 illustrates an example process 900 for determining material properties of an object represented in an image file that can be utilized in accordance with various embodiments. It should be understood that, for any process discussed herein, there can be additional, fewer, or alternative steps performed in similar or alternative orders, or in parallel, within the scope of the various embodiments. In this example, a reference image is received 902. The reference image may correspond to a 3D image generated using a physical object and may include a representation of the physical object, as well as camera information associated with the image. It should be appreciated that more than one image may be received, but for clarity, a single reference image will be discussed. As noted above, the reference image may include the representation of the object as seen from a particular viewpoint and may include camera information associated with that viewpoint. While this may be sufficient to determine the object, for example via a machine learning system with an appropriate object recognition and classification module, it may be challenging to generate a 3D model that will enable accurate representations from a variety of different viewpoints.

Neighboring image views may be received 904, for example from a database of images. The neighboring image views include the object, but are from a different viewpoint from the reference viewpoint. By way of example, if the reference image were at a viewpoint corresponding to a ride side view, a neighboring viewpoint may be from a left side view. It should be appreciated that the neighboring image views may correspond to a variety of different viewpoints in an approximately hemi-spherical area around the object. Moreover, as noted above, the neighboring image views may also include camera information corresponding to the respective viewpoints of the neighboring image views. The neighboring image views may be from viewpoints that are at a different height, from a different radial direction, or from a different axial direction. Pixel information from the neighboring image views are projected to the reference viewpoint 906. For example, point locations of the object, such as specific pixel locations, may be translated to determine whether pixel locations in the reference image and in the neighboring view both have a value. In this manner, projected images may be generated that include a representation of how pixel locations for the object look from a variety of different viewpoints. In certain embodiments, there may not be a value for a specific pixel location, such as a location that is not visible from a neighboring viewpoint, but is visible from the reference viewpoint. This may be referred to as a visibility test to determine whether one or more features are visible from each of the neighboring views. The resultant projected image may include noise or holes, as described above, as a result of various pixel locations not be visible from the selected viewpoint.

In embodiments, one or more machine learning systems may be incorporated to identify and/or classify various features of the object, or the object itself. The machine learning systems may be configured to run in parallel (e.g., at least a portion of the processing for one overlaps at least a portion of the processing for another). Moreover, it should be appreciated that components of the method may be processed on different, distinct neural networks, or on the same network. A first encoder, which may be part of the one or more machine learning systems, processes the reference image 908. Processing may include identifying different material properties for the object in the reference image. For example, different material properties may correspond to albedo, roughness, and metallicness and may determine how an object is rendered in an AR or VR application. In parallel, or substantially in parallel, a second encoder processes the projected images 910. The second encoder may be similar to the first encoder in that different material properties may be identified using the network. As noted above, the first and second encoders may be operating on the same neural network or on different neutral networks.

The processing steps for the projected image may include more images than the processing for the reference image. As a result, different components or identified areas of the projected images may be collected or combined 912. For example, a maxpool layer may collect one or more identified features from the projected images. The combined projected images may be combined with one or more features, identified via the first encoder, of the reference image 914. In other words, data from the reference image and the neighboring view images may be used in subsequent steps of the process. Advantageously, this provides additional information for processing, which may simplify later processing steps.

A decoder may be used to process the combined features from the projected images and the reference image 916. For example, a decoder may be particularly selected to identify a particular material property, such as albedo, roughness, metallicness, or normal. As noted above, in embodiments, the decoder may be part of the same neural network or a different neural network as the first and/or second encoders. Each of the combined features may be directed toward a particular decoder, which may determine the respective material properties for the object 918. For example, a decoder corresponding to albedo may generate an image identifying base colors of various components of the object. Similarly, a decoder corresponding to metallicness may generate an image identifying reflective components of the object. The information may be used to generate a texture map for the object 920. The texture map, in embodiments, may be stitched or applied to a geometric model for the object.

Figure 10:
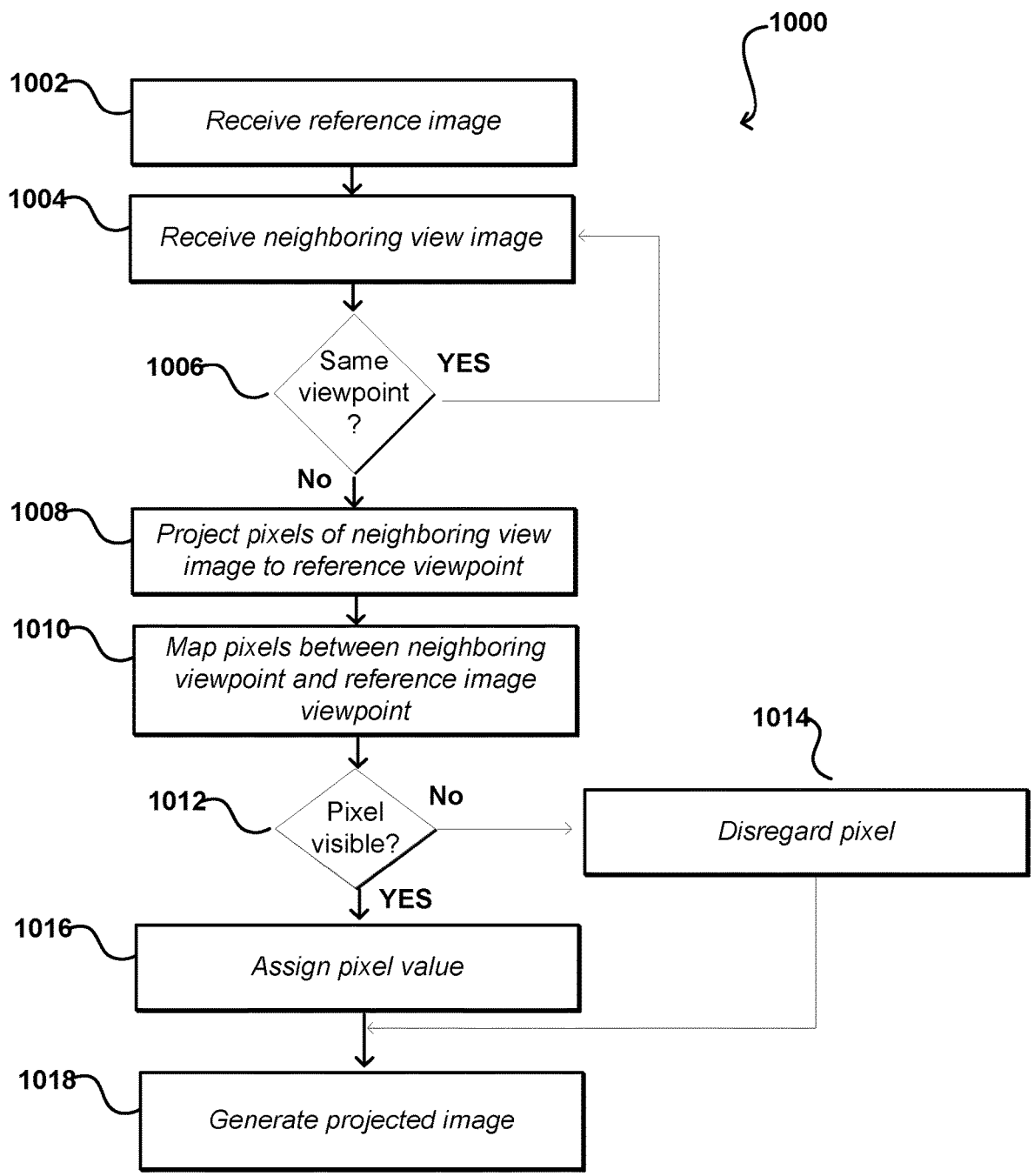
FIG. 10 illustrates an example process for creating a three-dimensional object model that can be utilized in accordance with various embodiments.

FIG. 10 illustrates an example process 1000 for generating projected images for use with embodiments of the present disclosure. The example begins by receiving a reference image 1002. As noted herein, the reference image may include a representation of a physical object. The reference image is positioned at a first viewpoint or reference viewpoint, corresponding to a still image of the object. A neighboring view image is also received 1004. The neighboring view image corresponds to an image that may be of the same object from a different viewpoint. For example, at a different angle or height. A viewpoint of the neighboring view image is evaluated to determine whether it is different from the first viewpoint 1006. If not, a different neighboring view image is obtained. As described herein, providing a variety of different viewpoints enables SVBRDF evaluation of the object for generation of a model, and as a result, providing an image from the same viewpoint does not provide additional information to facilitate the estimation.

Pixels from the neighboring view image are projected onto the reference image viewpoint 1008. That is, pixel values corresponding to like locations in both the reference image the neighboring view image are utilized to illustrate an appearance of the object from the reference image viewpoint. In various embodiments, the pixels are mapped between the reference image and the neighboring view image 1010. As described above, mapping may include determining a pixel corresponds to a similar location between the reference image and the neighboring view image. By combining data from several different neighboring view images, the reference image may be reconstructed.

Visibility testing may be used to determine whether a pixel or location within the neighboring view image is visible from the reference viewpoint 1012. For example, in various embodiments, one or more pixels may be occluded by the object itself, and as a result, are not visible in the reference viewpoint. Visibility testing may include testing if the different in depth in a neighbor view is less than a threshold. Thereafter, pixels that fail the testing may be disregarded 1014, while pixels that pass may be assigned a pixel value 1016. As a result, a projected image may be generated utilizing data from one or more neighboring view images to construct the object from the reference viewpoint 1018. For example, pixel values from the one or more neighboring view images may be combined to form the representation of the object.

Figure 11:
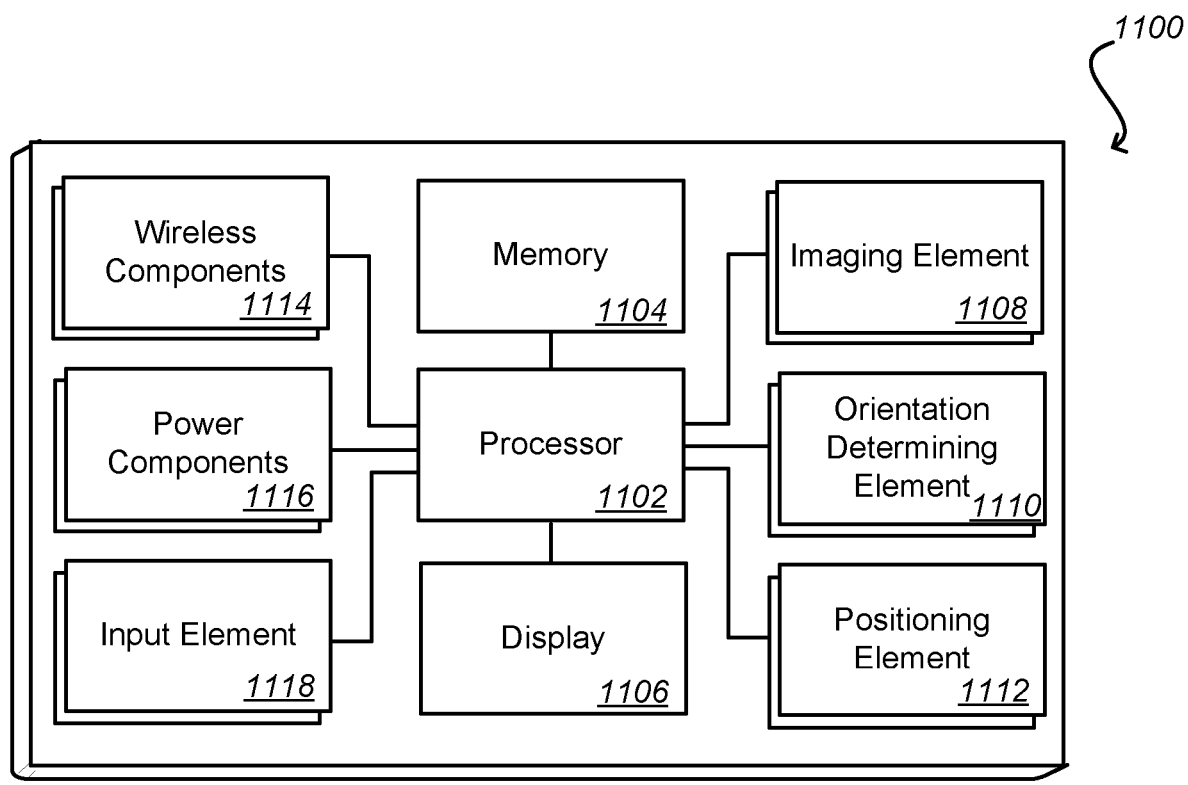
FIG. 11 illustrates a set of example components of one or more devices of the present disclosure, in accordance with various embodiments.

FIG. 11 illustrates a set of basic components of an example computing device 1100 that can be utilized to implement aspects of the various embodiments. In this example, the device 1100 includes at least one processor 1102 for executing instructions that can be stored in a memory device or element 1104. In various embodiments, the at least one processor 1102 may include a graphics processing unit, which may be integrated into or separate from other processors utilized with the device 1100. As would be apparent to one of ordinary skill in the art, the device can include many types of memory, data storage or computer-readable media, such as a first data storage for program instructions for execution by the at least one processor 1102, the same or separate storage can be used for images or data, a removable memory can be available for sharing information with other devices, and any number of communication approaches can be available for sharing with other devices. The device may include at least one type of display element 1106, such as a touch screen, electronic ink (e-ink), organic light emitting diode (OLED) or liquid crystal display (LCD), although devices such as servers might convey information via other means, such as through a system of lights and data transmissions. The device typically will include one or more networking components, such as a port, network interface card, or wireless transceiver that enables communication over at least one network. The device can include at least one input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 1100 can include one or more imaging elements 1108. One or more orientation determining elements 1110 can determine the orientation of the device, for example in relation to a user's face or eyes. Various camera-based and other sensors 1110 can be used to determine orientation. A positioning element 1112 can determine the position of the device. The positioning element 1112 can use one or more of GPS, local network detection, Bluetooth connection, or other protocols. One or more input elements 1110 can register user input, for example input received from a touch screen display. An example device 1100 will also include power components 1116 and wireless components 1114 to communicate with other devices wirelessly.

Figure 12:
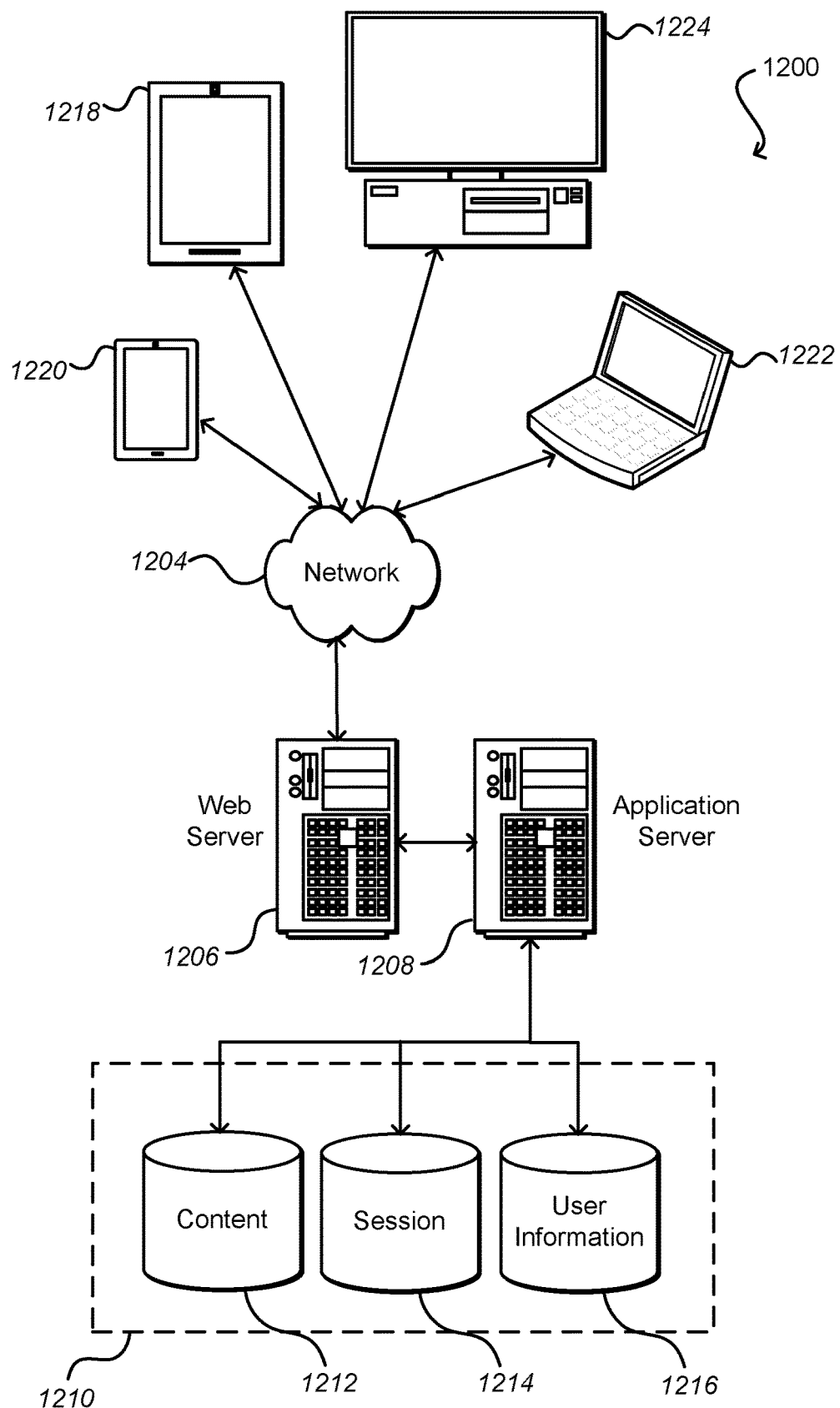
FIG. 12 illustrates an example computing environment that can be used to implement aspects of various embodiments.

FIG. 12 illustrates an example environment 1200 that may be used with embodiments of the present disclosure. As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment 1200 includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store as needed to execute aspects of one or more applications for the client device and handling a majority of the data access and business logic for an application. The application server 1208 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 1206. It should be understood that the Web server 1206 and application servers 1208 are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store 1210 illustrated includes mechanisms for storing content 1212 (e.g., production data) and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store. The data store 1210 is operable, through logic associated therewith, to receive instructions from the application server and obtain, update or otherwise process data in response thereto. In one example, a user might submit a search request for a certain type of item. In this case, the data store 1210 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 1206, 1208 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1200 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 1218, 1220, 1222, 1224 which can be used to operate any of a number of applications. User or client devices 1218, 1220, 1222, 1224 can include any of a number of general purpose personal computers, such as desktop 1224 or laptop computers 1222 running a standard operating system, as well as cellular, wireless and handheld devices 1218, 1220 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 1204 that would be familiar to those skilled in the art for supporting communications using any of a variety of commercially-available protocols, such as TCP/IP, FTP, UPnP, NFS, and CIFS. The network 1204 can be, for example, a local area network, a wide-area network, a virtual private network, the Internet, an intranet, an extranet, a public switched telephone network, an infrared network, a wireless network and any combination thereof.

In embodiments utilizing a Web server 1206, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 1200 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
processing a reference image, including a geometric representation of a physical object from a reference viewpoint, using a first encoder trained to identify a feature of the physical object;
receiving a plurality of neighboring view images, each of the neighboring view images including the physical object as viewed from a respective viewpoint different than the reference viewpoint;
processing a plurality of projected view images, generated from the plurality of neighboring view images of the physical object, using a second encoder to identify the feature of the physical object;
determining visible pixels, in each of the plurality of neighboring view images, with respect to the reference viewpoint;
mapping pixel values for the visible pixels to a reference coordinate system;
combining an identified feature from the reference image and the plurality of projected view images; and
processing the identified feature using a plurality of decoders, each decoder being trained to identify a material property of the identified feature.

2. The computer-implemented method of claim 1, further comprising:
generating a three-dimensional model for the physical object including the material property and the geometric representation of the physical object.

3. The computer-implemented method of claim 1, wherein the material property includes at least one of albedo, roughness, or metallicness.

4. The computer-implemented method of claim 1, wherein the first encoder for processing the reference image and the second encoder for processing the plurality of projected view images operate in parallel.

5. The computer-implemented method of claim 1, wherein the first encoder, the second encoder, and the plurality of decoders form a network structure having an hourglass shape.

6. The computer-implemented method of claim 1, further comprising:
determining a normal vector for respective projected view images of the plurality of projected view images, the normal vector being a transformation from a ground truth normal to a camera space normal.

7. The computer-implemented method of claim 1, further comprising:
providing a skip connection at each level of the first encoder or the second encoder and one or more decoders of the plurality of decoders.

8. A system, comprising:
at least one processor; and
a memory device including instructions that, when executed by the at least one processor, cause the system to:
process a reference image, including a geometric representation of a physical object from a reference viewpoint, using a first encoder trained to identify a feature of the physical object;
receive a plurality of neighboring view images, each of the neighboring view images including the physical object as viewed from a respective viewpoint different than the reference viewpoint process a plurality of projected view images, generated from the plurality of neighboring view images of the physical object, using a second encoder to identify the feature of the physical object;
determine visible pixels, in each of the plurality of neighboring view images, with respect to the reference viewpoint;
map pixel values for the visible pixels to a reference coordinate system;
combine an identified feature from the reference image and the plurality of projected view images; and
process the identified feature using a plurality of decoders, each decoder being trained to identify a material property of the identified feature.

9. The system of claim 8, wherein the material property includes at least one of albedo, roughness, or metallicness.

10. The system of claim 8, wherein the first encoder and the second encoder operate in parallel.

11. The system of claim 8, wherein the instructions, when executed by the at least one processor, further cause the system to:
determine a normal vector for respective projected view images of the plurality of projected view images, the normal vector being a transformation from a ground truth normal to a camera space normal.

12. The system of claim 8, wherein the instructions, when executed by the at least one processor, further cause the system to:
provide a skip connection at each level of the first encoder or the second encoder and one or more decoders of the plurality of decoders.

13. The system of claim 8, wherein the first encoder, the second encoder, and the plurality of decoders form a network structure having an hourglass shape.

14. A computer-implemented method, comprising:
receiving a reference image, including a representation of a physical object, the reference image being a 3-channel image including a three-dimensional (3D) mesh for a geometry of the physical object;
receiving a neighboring view image, including the representation of the physical object, the neighboring view image having a neighboring viewpoint different than a reference image viewpoint;

projecting the neighboring view image to the reference image viewpoint;
determining respective values for a plurality of pixels for the neighboring view image, the value being indicative of a visibility of a pixel of the plurality of pixels, the pixel having a positive value when visible with respect to the reference image viewpoint and having a zero value when non-visible with respect to the reference image viewpoint;
generating a projected image of the physical object, based at least in part on the respective values for the plurality of pixels;
processing the reference image, using a first encoder, to identify a feature of the physical object;
processing the projected imaged, using a second encoder, to identify the feature of the physical object;
combining the identified feature from both the reference image and the projected image;
processing the identified feature, using a plurality of decoders, to identify material properties of the identified feature, each decoder of the plurality of decoders being trained to identify a particular material property;
creating a texture map for the physical object;
mapping the texture map on to the 3D mesh; and
generating a 3D model of the physical object, the 3D model including information indicative of the material properties and the geometry of the physical object.

15. The computer-implemented method of claim 14, wherein the material properties include albedo, roughness, metallicness, or a combination thereof.

16. The computer-implemented method of claim 14, wherein the neighboring view image includes a plurality of neighboring view images, further comprising:
combining the identified feature from a plurality of processed projected images, the projected images including pixel values for respective neighboring view images as viewed from the reference image viewpoint.

17. The computer-implemented method of claim 14, further comprising:
obtaining camera data for the reference image, the camera data indicative of the reference image viewpoint;
mapping the plurality of pixels from the neighboring view image to a coordinate system of the reference image, based at least in part on the camera data;
determining a difference in respective pixel depths of the plurality of pixels; and
determining the respective pixel depths exceed a threshold.

18. The computer-implemented method of claim 14, wherein a machine learning system includes the first encoder, the second encoder, and the plurality of decoders, a network structure of the machine learning system being an hourglass shape.

* * * * *